United States Patent

Suzuki et al.

[11] Patent Number: 6,061,805
[45] Date of Patent: May 9, 2000

[54] METHOD FOR EXECUTING AN ERROR RECOVERY PROCEDURE

[75] Inventors: Hiroaki Suzuki; Hideo Asano, both of Machida; Atsushi Tobari, Fujisawa; Satoshi Nishino, Ayase; Shuji Yamada, Fujisawa; Haruo Andoh, Zama; Tsuguaki Kowa, Yamato, all of Japan

[73] Assignee: International Business Machines Corporation, Armonk, N.Y.

[21] Appl. No.: 08/969,204

[22] Filed: Nov. 12, 1997

[30] Foreign Application Priority Data

Nov. 19, 1996 [JP] Japan ................................. 8-307743

[51] Int. Cl.$^7$ ....................................... G06F 11/00
[52] U.S. Cl. ................................. 714/2; 711/114
[58] Field of Search ........................ 714/2, 3, 5, 6, 714/7, 8, 23, 25, 39, 41, 44, 48, 54, 770, 764, 758, 4, 10, 15, 18; 711/114; 360/53, 77.08, 48

[56] References Cited

U.S. PATENT DOCUMENTS

| | | | |
|---|---|---|---|
| 4,205,374 | 5/1980 | Bardsley, III et al. | 364/200 |
| 4,403,288 | 9/1983 | Christian et al. | 364/200 |
| 5,283,790 | 2/1994 | Kawashita | 371/101 |
| 5,379,411 | 1/1995 | Morgan et al. | 395/575 |
| 5,446,872 | 8/1995 | Ayres et al. | 395/180 |
| 5,530,960 | 6/1996 | Parks et al. | 395/825 |
| 5,546,533 | 8/1996 | Koyama | 395/182.03 |
| 5,574,856 | 11/1996 | Morgan et al. | 395/185.05 |
| 5,610,808 | 3/1997 | Squires et al. | 364/131 |
| 5,758,057 | 5/1998 | Baba et al. | 395/182.05 |
| 5,768,620 | 6/1998 | Johnson et al. | 395/835 |
| 5,774,643 | 6/1998 | Lubbers et al. | 395/182.18 |
| 5,781,920 | 7/1998 | Takagi | 711/114 |
| 5,822,142 | 10/1998 | Hicken | 360/53 |
| 5,844,919 | 12/1998 | Glover et al. | 371/140.14 |
| 5,889,935 | 3/1999 | Ofek et al. | 395/182.04 |
| 5,909,334 | 6/1999 | Barr et al. | 360/53 |
| 5,913,927 | 6/1999 | Nagaraj et al. | 714/8 |

*Primary Examiner*—Robert W. Beausoliel, Jr.
*Assistant Examiner*—Nadeem Iqbal
*Attorney, Agent, or Firm*—Roy W. Truelson; James R. Nock

[57] ABSTRACT

An error recovery procedure (ERP) in a storage device such as a rotating magnetic hard disk drive is executed to the last step regardless of the established time-out period for an instruction, thereby more reliably recovering from errors. In accordance with one embodiment of the invention, when a disk drive receives a reset instruction from a host during the execution of an ERP, it executes the ERP until the error is recovered, or to the last step without interrupting the ERP. Further, in accordance with another embodiment of the invention, when a disk drive receives a reset instruction during the execution of an ERP, it stops execution of the ERP and holds the number K of the step which was completed immediately before stopping, and when receiving a retry instruction after that, sequentially executes the ERP from the K+1-th error recovery step.

22 Claims, 4 Drawing Sheets

[Figure 1]
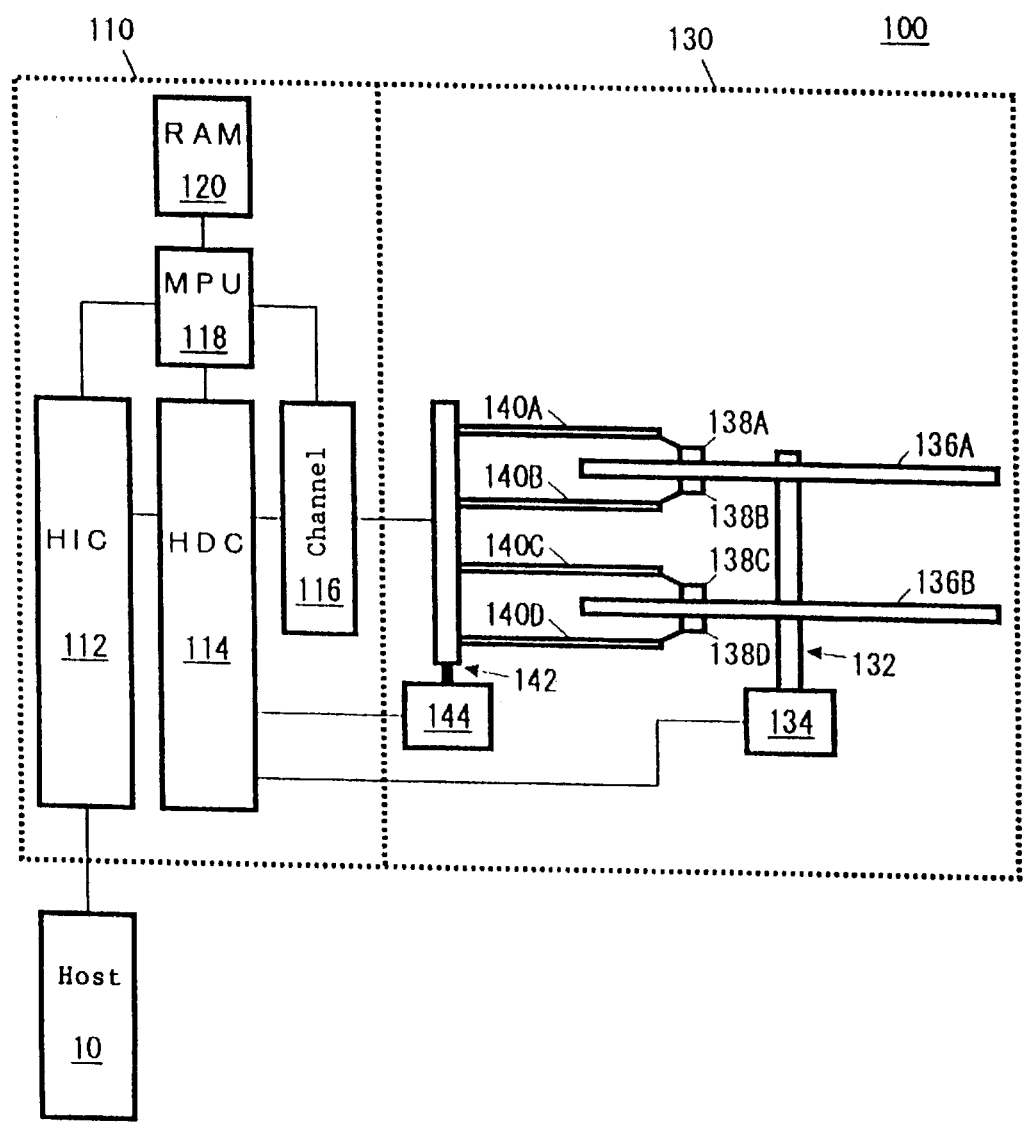

[Figure 2]
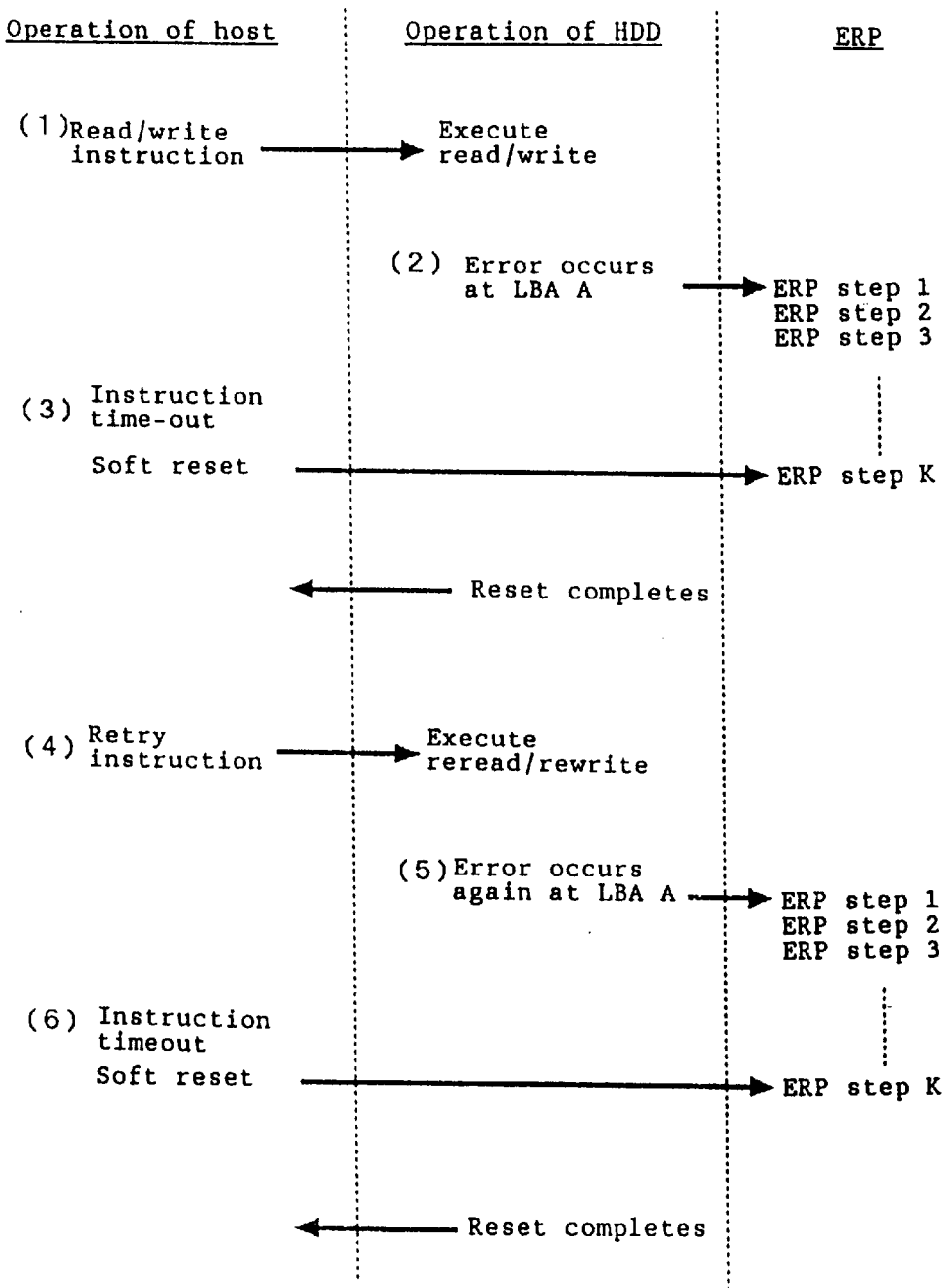

[Figure 3]
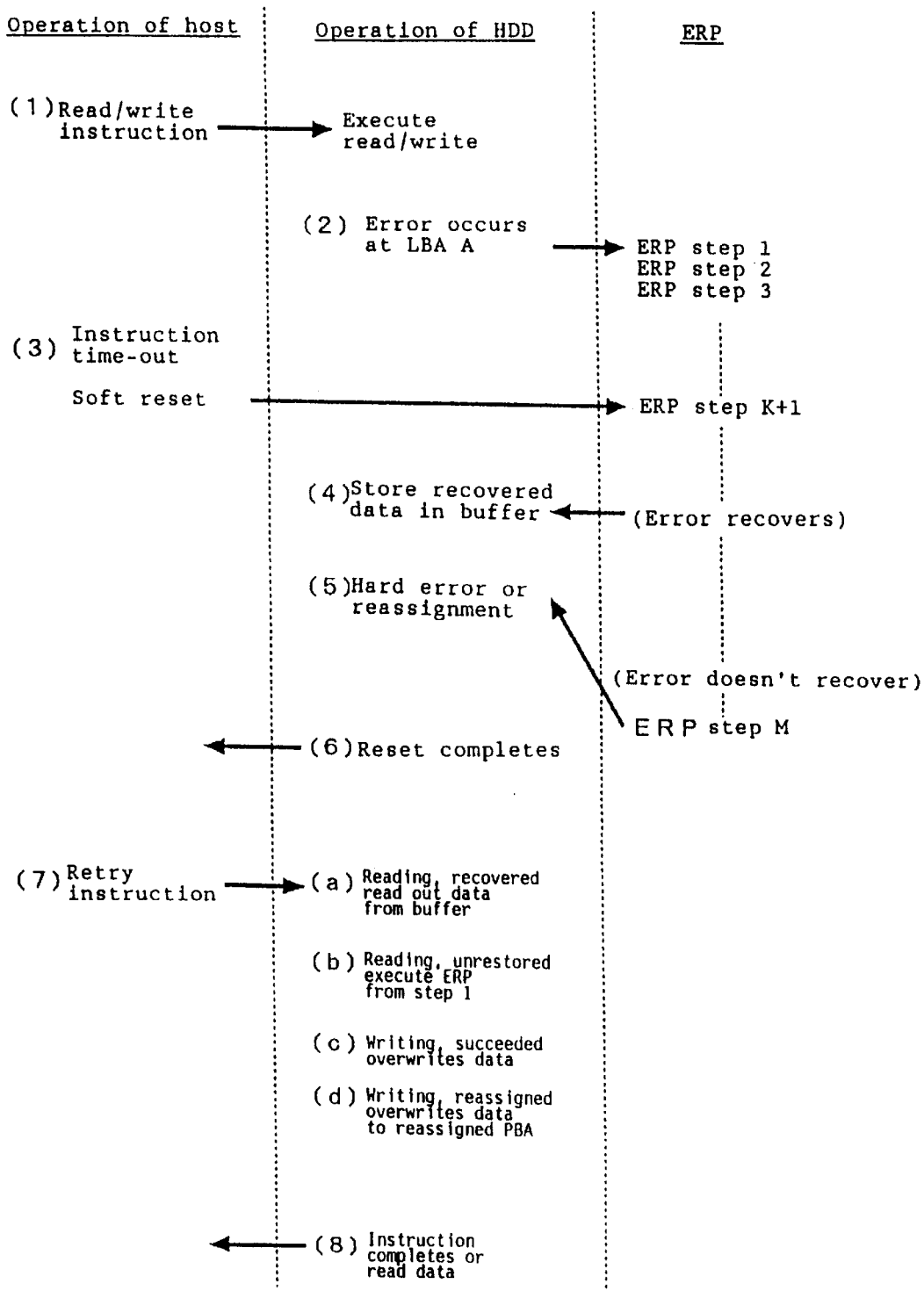

[Figure 4]
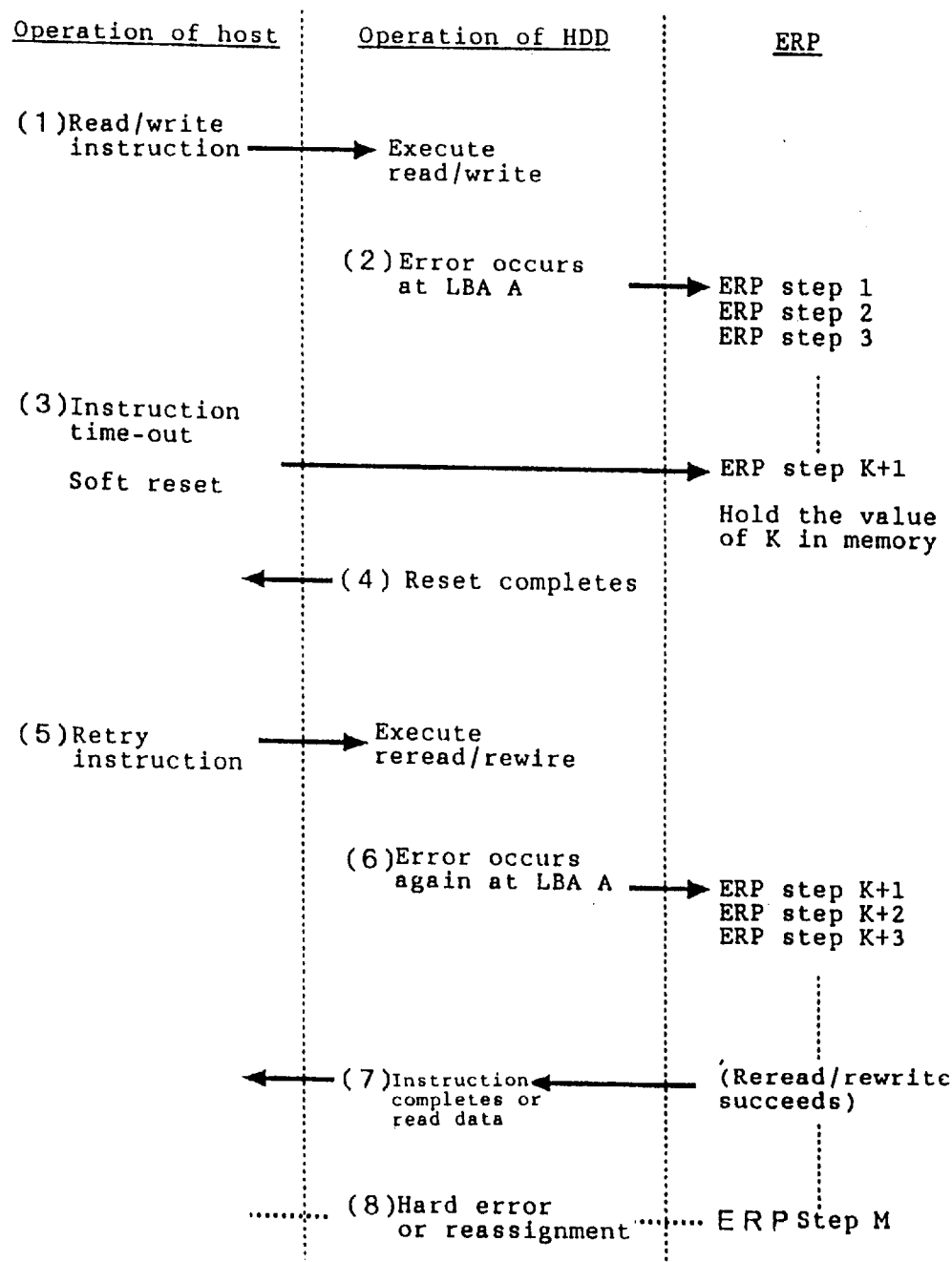

METHOD FOR EXECUTING AN ERROR RECOVERY PROCEDURE

FIELD OF THE INVENTION

The present invention is related to an error recovery method in a storage device. More specifically, it is related to an error recovery procedure (ERP).

BACKGROUND OF THE INVENTION

A disk drive is a device for recording data on the surface of a disk and reading it. A head having a signal transducer is positioned at a desired location on a track on which data is recorded, and it reads or writes data. As a means to recover an error which occurs when data is read or written by the head, there is an error recovery procedure (ERP) comprising various error recovery steps.

On a disk, a read error occurs as a result of various causes such as a flaw, ununiformity of the magnetic substance, or change of the magnetic substance with time. Generally, for errors occurring in the data portion of the disk, an ECC, a conventional error recovery code, is used to execute an error recovery process. Further, various recovery procedures are executed, such as change of the read gain, change of the offtrack, and change of the bias value of an MR (magnetoresistive) element if it is used as the read head. If data is successfully reread by executing such recovery procedures, the data is continuously used. If the error cannot be recovered by a plurality of error recovery procedures, it is recognized as a hard error, or if the data can be reassigned to another area, the corresponding area is made an unusable area and a process for reassigning the data to the other area is performed.

In many of the recent disk drives, a magnetoresistive (MR) transducer head is used. This utilizes a very small resistance change due to change in a magnetic field By causing a d.c. current to flow through the MR element, a resistance change is converted to a voltage signal to perform the reading of data.

However, one of the read errors, which occurs in this approach of reading a resistance change, is thermal asperity. A thermal asperity means that a protrusion or deposit on a disk surface crashes against the read head and generates a resistance change due to a temperature change in the MR element, causing an abnormal signal.

One of the countermeasures against a thermal asperity is a technique called low rpm burnish. A low rpm burnish is an approach in which the rpm (revolutions per minute) of the disk is decreased to reduce the fly height of the magnetic head, thereby to positively scrape off the protrusion on the disk which caused the thermal asperity. This may also form one of the abovementioned error recovery procedures (ERPs).

There are various countermeasures against errors during data reading or writing. These are generally stored as a series of steps in an error recovery procedure. When the error recovery procedure is started, these steps are sequentially executed.

The causes of errors are not always the same, and there may be various causes. Accordingly, error recovery procedures meeting these various causes of errors are required. An error recovery procedure generally performs a rereading by changing and adjusting the standard read conditions one by one, which are defined among the disk, magnetic head, and HDC (hard disk controller). The read conditions may include, for instance, offtrack amount which is an offset amount between the center of the magnetic head and the center of a track, bias current value given to an MR element if the magnetic head includes the MR element, adjustment of the auto-gain control (AGC) for making the amplitude of a reproduced signal constant, adjustment of the speed and gain of the PLL circuit for stabilizing the sampling frequency (making the tracking speed a predetermined speed), and the like.

Normally, a plurality of error recovery steps are registered as an ERP. Those steps are executed in a predetermined order. A reread is performed for each step, and the ERP terminates when the reread has succeeded. If the reread is not successful, the ERP terminates when a preset maximum number of rereads is reached or the last step of the ERP is ended. Additionally, the ERP may be terminated by the time-out of a read or write instruction.

For a time-out, the host system may perform a retry of the instruction in the time-out state after executing a reset (soft reset or hard reset) for the disk drive. If a write or read error occurs again during the retry, the ERP is executed from the first step.

It may take 10 to 20 seconds to execute the steps of the above low rpm burnish. On the other hand, the time elapsing before the time-out of a read or write instruction depends on the operating system (OS) or BIOS of the host system, and conventionally, it was often about 30 seconds, but it may be only several seconds in the recent OSs such as OS/2 (a trademark) of IBM Corp. For this, a time-out of the read or write instruction may be reached before all ERP steps are completed In such a case, only some of the ERP steps are executed because of the limited time to the time-out, and thus there is a high possibility that, even if there is an effective step after that, an error occurs without the execution of that step. Further, for a read or write instruction to a plurality of sectors, if errors occur in a plurality of sectors, the ERP steps are executed in each sector, and thus the read or write instruction may reach the time-out before the completion of the ERP steps for the all sectors in error even if the time to the time-out is relatively long.

SUMMARY OF THE INVENTION

It is therefore an object of the present invention to provide an enhanced data storage method and apparatus.

Another object of the present invention is to increase the error recovery capability of a data storage apparatus.

Another object of the present invention to provide a method and apparatus which ensures the execution till the last step of an error recovery procedure regardless of the time to time-out of an instruction, thereby to more reliably recover an error.

Another object of the present invention to provide an error recovery method and apparatus suitable for an OS in which the time to time-out is short.

Another object of the present invention to provide a method and apparatus which ensures the execution of ERP steps requiring a relatively long execution time such as a low rpm burnish, thereby to more reliably recover an error.

In accordance with the present invention, even if a disk drive receives a reset instruction during the execution of an ERP, it executes the ERP to the last step until recovery without interrupting the ERP.

That is, the present invention provides a method for executing an error recovery procedure (ERP) comprising a plurality of error recovery steps, the method comprising: executing error recovery steps, and executing the next error recovery step regardless of whether or not a predetermined signal has been received.

Further, in accordance with another aspect of the present invention, if the disk drive receives a reset signal during the execution of an ERP, it stops the execution of the ERP and holds the number K of the step the execution of which has been completed immediately before stopping, and when receiving a retry instruction thereafter, it sequentially executes the ERP from the K+1-th error recovery step.

That is, the other aspect of the present invention is a method for executing an error recovery procedure (ERP) comprising a plurality of error recovery steps, the method comprising: executing error recovery steps; in response to a first signal, stopping the execution of error recovery steps and holding the number K of the step the execution of which has been completed immediately before the stopping, and in response to a second signal, sequentially executing the ERP from the K+1-th error recovery step for the sector for which the execution of the ERP has been stopped In accordance with the present invention, there is not the disadvantage that the steps after a particular step of ERP are not executed, and all the ERP steps are given a chance to execute until a recovery is obtained. Accordingly, the probability of error recovery is high. Thus, the various steps included in the error recovery procedure can be efficiently executed, and the reliability of error recovery can be increased.

BRIEF DESCRIPTION OF THE DRAWING

FIG. 1 is a block diagram of a hard disk drive (HDD) to which the present invention is applied;

FIG. 2 is a diagram showing a method for executing the ERP of the background art;

FIG. 3 is a diagram showing a first embodiment of the present invention; and

FIG. 4 is a diagram showing a second embodiment of the present invention.

DETAILED DESCRIPTION OF THE PREFERRED EMBODIMENT

FIG. 1 is a block diagram of a hard disk drive (HDD) to which the present invention is applied. Disk drive 100 comprises a controller unit 110 and a disk unit 130. Controller unit 110 includes a host interface controller (HIC) 112 connected to a host system 10, a hard disk controller (HDC) 114 connected to host interface controller 112 for controlling the disk unit, a channel 116 connected to hard disk controller 114 for controlling read and write signals, an MPU 118 connected to HIC 112, HDC 114 and channel 116 for controlling them, and RAM 120 connected to MPU 118 for storing the microcode executed by the MPU. Disk unit 130 includes a motor 134 for rotating a spindle 132. On spindle 132, disks 136A and 136B are mounted so as to rotate integrally with spindle 132. The number of disks is two in the figure, but it may be one or more than two.

Heads 138A, 138B, 138C, and 138D are disposed and supported by actuator arms 140A, 140B, 140C, and 140D to face a respective disk surface. Actuator arms 140A to 140D are attached to a voice coil motor (VCM) 144 via a pivot shaft 142, and the rotation of VCM 144 causes heads 138A to 138D to move to a desired radial position. Motor 134 and VCM 144 are connected to HDC 114, which controls the rpm, speed, and the like of them. Heads 138A to 138D are connected to channel 116, and the read/write signals are controlled by channel 116.

Generally, on the magnetic disk of a hard disk or the like, data tracks are concentrically formed. The reading or writing of information from/to the disk is performed after the disk is rotated and the head is moved along substantially the radial direction of the disk so as to be positioned at a particular data track (seek). The positioning of the head at a particular data track is carried out by reading head position identifying information prerecorded on the disk.

After the head is positioned at a desired track, data reading or writing is performed. At this time, a failure to read or write correct data, or an error, may occur. Many of the errors occurring are caused by loss of data. Data loss is often caused by a flaw on the disk surface, which occurs with time, damage of the magnetic substance due to a change with time or the like. Usually, the initial data reading from a disk is carried out under standard read conditions set in the disk, head, and HDC.

If an error occurs during reading performed according to these predetermined standard conditions, the reading is carried out again by intentionally changing the trackability, or maintaining the amplification factor of the auto-gain control (AGC) for the signal amplification. These error recoveries by changing the conditions are performed by activating an ERP (error recovery procedure) in which a plurality of error recovery steps are sequentially executed.

If data cannot successfully be written even by means of the ERP, the error is recognized to be a hard error, and data reassignment is performed, thereby recording the data in a particular alternate sector called a spare sector. Further, in reading, if data can be successfully read only during the predetermined ERP steps, the data is written to a spare sector, and simultaneously data reassignment is made.

The ERP may include, for instance, as error recovery steps which can be processed in a short time: (a) AGC hold; (b) offtrack read; (c) skip reading of the servo region; and the like. The ERP may further include, as steps requiring a relatively long time: (d) butterfly seek; and (e) low rpm burnish. In the butterfly seek, a seek operation is repeated several times in the vicinity of the track in which an error has occurred, to give positional control of the head to a target track again. In the low rpm burnish, the fly height of the head is reduced to remove protrusions, dust or the like on the disk using the structure of the head.

FIG. 2 shows a method for executing an ERP of the background art. The operation is described below.

(1) A read or write instruction is transferred from a host system to a HDD, which responds to it by executing the read or write.

(2) If a read or write error occurs at a logical block address (LBA) A, the ERP is invoked from RAM, and the MPU sequentially executes an ERP from step 1 of the ERP through the channel.

(3) In a system in which the time elapsing before time-out is shorter than the execution time of the all steps of the ERP (assumed to be M steps), if the error is still not recovered when step K (<M) of the ERP is executed, the MPU receives a reset instruction from the host system, the ERP stops at step K, and the HDD sends a reset completion signal to the host. If the error has been recovered while the ERP was executed to step K, the HDD sends the recovered data to the host.

(4) A retry instruction is communicated from the host system to the HDD, which responds to it by executing a reread or rewrite. The number of retry instructions depend on the host system.

(5) If a read or write error occurs again in LBA A, the ERP is invoked from RAM, and the MPU sequentially executes the ERP again from step 1 of the ERP through the channel. If the error is not recovered, the probability of an error occurring again in the same LBA is generally high.

(6) The time to time-out is usually constant in a system, and accordingly, if the error is still not recovered when step K of the ERP is executed, the MPU receives a reset instruction from the host system, the ERP stops at step K of the ERP, and the HDD transmits a reset completion signal to the host.

(7) If a retry instruction is further transmitted, (4) to (6) are repeated.

These steps are stored as a microcode program in a memory such as a ROM on the circuit board. Further, all or some of the steps may be stored on the disc. In this case, they are read out from the disk when the hard disk is started up, and stored in a memory such as a RAM for execution.

In the above described background art, since the time to time-out is shorter than the execution time of all the steps, and the ERP is executed again from step 1 in a retry, steps K+1 to M of the ERP are not executed. For this, even if a step effective for recovering the error exists among steps K+1 to M of the ERP, the possibility of the error being recovered is low because that step is not executed.

FIG. 3 shows a first embodiment of the present invention. The operation is described below.

(1) A read or write instruction is transferred from a host system to a HDD, which responds to it by executing the read or write.

(2) If a read or write error occurs at a LBA A, an ERP is invoked from RAM, and the MPU sequentially executes the ERP from step 1 through the channel.

(3) In a system in which the time to time-out is shorter than the execution time of all the steps of the ERP (M steps), if the error is still not recovered when step K (<M) of the ERP is executed, the MPU receives a reset instruction from the host system. At this point, the ERP does not stop, and step K+1, and the steps after that are continuously executed. Thus, in the first embodiment, the next step of the ERP is executed regardless of whether or not a reset instruction is received from the host system.

(4) In reading, if the error is recovered during the execution of steps K+1 through M of the ERP, the recovered data is stored in a buffer memory such as a RAM in the HDD, and the host system is not immediately notified of the recovery. In addition, a reassignment operation for writing the read data to another physical block address (PBA) is performed. In writing, if the data is written successfully during the execution of steps K+1 through M of the ERP, the host system is not notified of the success.

(5) If the error is still not recovered by the time step M of the ERP has executed, it is recognized to be a hard error for a read instruction, and for a write instruction, data is reassigned to another PBA and data is written to the reassigned PBA.

(6) After performing a reset operation, the HDD transmits a reset completion signal to the host. This step may be executed before step (4) or (5), or in the middle of steps (4) or (5).

(7) A retry instruction is communicated from the host system to the HDD, which responds to it by executing a reread or rewrite. A) If, in reading, the error is recovered in the previous steps, the data from LBA A, which is stored in the buffer memory, is read out from the buffer memory rather than the disk. B) If, in reading, the error is not recovered in the previous steps and if an error occurs in the reread, then the ERP is executed from step 1. C) If, in writing, the write was successfully made in the previous steps, the data is overwritten. D) If, in writing, the write failed in the previous steps, or reassignment is made, then data is overwritten to the reassigned PBA.

(8) If the data is successfully reread, the HDD sends the read data to the host, and if the data is successfully rewritten, the HDD transmits an instruction completion signal to the host.

In the above described first embodiment, since the steps of the ERP are executed until data is recovered regardless of the time to time-out, there is not the drawback that the steps after a particular step are always not executed. Further, since all the ERP steps are given a chance to execute until data is recovered, the probability of error recovery is high. Further, in reading, since the data in LBA A, which is recovered by the ERP steps after time-out, is stored in the buffer and read out from the buffer memory in a retry, it is not necessary to execute the ERP again in order to read LBA A. On the other hand, the steps including the reassignment are completed if the write fails, and thus, also in writing, it is not necessary to execute the ERP again. Accordingly, a fast and reliable response can be expected for a retry.

FIG. 4 shows a second embodiment of the present invention. The operation is described below.

(1) A read or write instruction is transmitted from a host system to a HDD, which responds to it by executing the read or write.

(2) If a read or write error occurs at a LBA A, an ERP is invoked from RAM, and the MPU sequentially executes the ERP from step 1 through the channel.

(3) In a system in which the time to time-out is shorter than the execution time of all the steps of the ERP (M steps), if the error is still not recovered when step K (<M) of the ERP is executed, the MPU receives a reset instruction from the host system. At this point, the MPU stops the execution of the ERP, and holds in a memory the number K of the step the execution of which has been completed immediately before stopping.

(4) After performing a reset operation, the HDD transmits a reset completion signal to the host.

(5) A retry instruction is transmitted from the host system to the HDD, which responds to it by executing a reread or rewrite.

(6) If a read or write error occurs again at LBA A, the number K of the step the execution of which has been completed immediately before that is retrieved from the memory, and the MPU sequentially executes the ERP from step K+1 of the ERP through the channel. If no read or write error occurs at LBA A, the process goes to step (7). In addition, if a new read or write error occurs at a LBA other than LBA A, the ERP is executed from step 1 as usual.

(7) If the data is successfully reread, the HDD sends the read data to the host, and if the data is successfully rewritten, the HDD transmits an instruction completion signal to the host.

(8) If the error is not recovered by the time step M of the ERP has executed, it is recognized to be a hard error for a read instruction, and for a write instruction, data is reassigned to another physical block address (PBA), and data is written to the reassigned PBA.

In the above described second embodiment, even if the execution of the ERP is interrupted by time-out, the ERP is executed from the next step in a retry, and thus, there is not the defect that the steps after a particular step are always not executed Further, since all the ERP steps are given a chance to execute until a recovery is obtained, the probability of error recovery is high.

Although a specific embodiment of the invention has been disclosed along with certain alternatives, it will be recognized by those skilled in the art that additional variations in form and detail are possible within the scope of the following claims.

What is claimed is:

1. A method for operating a storage device connected to a host system, said method comprising the steps of:
    executing an error recovery procedure in response to an error occurring while attempting to execute an instruction to transfer data;
    receiving a reset instruction from said host system, said reset instruction being received before completion of said error recovery procedure; and
    continuing to execute said error recovery procedure until completion after receiving said reset instruction.

2. The method for operating a storage device of claim 1, wherein said error recovery procedure is executed until the error is recovered.

3. The method for operating a storage device of claim 1, wherein said error recovery procedure is executed until a predetermined final step of said error recovery procedure is completed.

4. The method for operating a storage device of claim 1, further comprising the steps of:
    performing a reset operation in response to said reset instruction received from said host system; and
    transmitting a reset completion signal to said host system after completing said reset operation.

5. The method for operating a storage device of claim 1, wherein said instruction to transfer data is a read instruction, and wherein data recovered by the error recovery procedure after the reception of said reset instruction is stored in a memory in said storage device.

6. The method for operating a storage device of claim 5, wherein the recovered data stored in said memory is returned in response to a retry instruction from said host system.

7. The method for operating a storage device of claim 1, wherein said instruction to transfer data is a write instruction, and wherein the position of data to be written is reassigned if the writing is not successful upon completion of the error recovery procedure.

8. The method for operating a storage device of claim 7, wherein data is written to the reassigned position in response to a retry instruction from said host system.

9. The method for operating a storage device of claim 1, wherein said storage device is a rotating magnetic disk drive storage device.

10. A method for operating a storage device connected to a host system, said method comprising the steps of:
    executing an error recovery procedure in response to an error occurring while attempting to execute an instruction to transfer data;
    receiving a reset instruction from said host system, said reset instruction being received after a portion of said error recovery procedure has been executed but before completion of said error recovery procedure;
    in response to said reset instruction, stopping the execution of said error recovery procedure and recording the portion of the error recovery procedure which has been executed;
    thereafter restarting the error recovery procedure and executing only that portion of the error recovery procedure which has not been executed.

11. A method for operating a storage device connected to a host system, said method comprising the steps of:
    executing an error recovery procedure in response to an error occurring while attempting to execute an instruction to transfer data;
    receiving a reset instruction from said host system, said reset instruction being received after a portion of said error recovery procedure has been executed but before completion of said error recovery procedure;
    in response to said reset instruction, stopping the execution of said error recovery procedure and recording the portion of the error recovery procedure which has been executed;
    thereafter restarting the error recovery procedure and executing only that potion of the error recovery procedure which has not been executed
    wherein said error recovery procedure comprises a plurality of sequentially executed steps, wherein said step of recording the portion of the error recovery procedure which has been executed records an identifier corresponding to the K-th sequential step of said error recovery procedure, said K-th sequential step being the last step of said error recovery procedure that was completed before stopping execution of said error recovery procedure, and wherein said step of thereafter restarting the error recovery procedure restarts the error recovery procedure from the (K+1)-th sequential step of said error recovery procedure.

12. The method for operating a storage device of claim 10, further comprising the steps of:
    performing a reset operation in response to said reset instruction received from said host system; and
    transmitting a reset completion signal to said host system after completing said reset operation.

13. The method for operating a storage device of claim 10, wherein said step of thereafter restarting the error recovery procedure is performed in response to a retry instruction received from said host system.

14. The method for operating a storage device of claim 10, wherein said error recovery procedure is executed until the error is recovered.

15. The method for operating a storage device of claim 10, wherein said error recovery procedure is executed until a predetermined final step of said error recovery procedure is completed.

16. The method for operating a storage device of claim 10, wherein said storage device is a rotating magnetic disk drive storage device.

17. An apparatus for executing an error recovery procedure comprising a plurality of error recovery steps, said apparatus comprising:
    a logic for executing error recovery steps; and
    a logic for receiving a reset signal, wherein said logic for executing error recovery steps executes the next error recovery step regardless of whether or not said logic for receiving a reset signal has received a reset signal.

18. An apparatus for executing an error recovery procedure comprising a plurality of error recovery steps, said apparatus comprising:
    a logic for executing error recovery steps;

a logic for receiving a reset signal, and a memory connected to said logic for executing error recovery steps, wherein said logic for executing error recovery steps responds to a reset signal to stop the execution of error recovery steps and store in said memory the number K of the step the execution of which has been completed immediately before stopping, and thereafter restarts the error recovery procedure to read out the value of K from said memory and sequentially execute the error recovery procedure from the K+1-th error recovery step.

19. A rotating magnetic disk drive storage device, comprising:

at least one rotatably mounted disk for storing magnetically encoded data;

at least one transducer for recording and reproducing data on said at least one disk;

a programmable processor for controlling the operation of said disk drive storage device; and a memory for storing a control program for execution on said programmable processor, said control program including an error recovery procedure for execution on said programmable processor in response to an error occurring while attempting to transfer data;

wherein, when said programmable processor is executing said error recovery procedure in response to an error and said disk drive storage device receives a reset instruction from a host system before completion of said error recovery procedure, said control program causes said programmable processor to continue to execute said error recovery procedure until completion after receiving said reset instruction.

20. The rotating magnetic disk drive storage device of claim 19, wherein said error recovery procedure executes in response to an error occurring while attempting to read data encoded on said at least one disk with said at least one transducer, and wherein said control program stores data, which is recovered by the error recovery procedure after the reception of said reset instruction, in said memory.

21. The rotating magnetic disk drive storage device of claim 20, wherein said control program returns the recovered data stored in said memory to said host system in response to a retry instruction from said host system.

22. A rotating magnetic disk drive storage device, comprising:

at least one rotatably mounted disk for storing magnetically encoded data;

a transducer for recording and reproducing data on said at least one disk;

a programmable processor for controlling the operation of said disk drive storage device; and a memory for storing a control program for execution on said programmable processor, said control program including an error recovery procedure for execution on said programmable processor in response to an error occurring while attempting to transfer data;

wherein, when said programmable processor is executing said error recovery procedure in response to an error and said disk drive storage device receives a reset instruction from said host system after a portion of said error recovery procedure has been executed but before completion of said error recovery procedure, said control program causes said programmable processor to stop execution of said error recovery procedure and record the portion of the error recovery procedure which has been executed; and wherein said control program subsequently causes said programmable processor to restart said error recovery procedure and execute only that portion of the error recovery procedure which has already been executed.

* * * * *